United States Patent [19]

Garze et al.

[11] Patent Number: 5,311,663
[45] Date of Patent: May 17, 1994

[54] DEVICE FOR TRIMMING COAXIAL CABLE

[75] Inventors: Josef Garze, Lawndale; James D. Ingram, Lakewood, both of Calif.

[73] Assignee: TRW Inc., Redondo Beach, Calif.

[21] Appl. No.: 940,574

[22] Filed: Sep. 4, 1992

[51] Int. Cl.$^5$ ............................................. B21F 21/00
[52] U.S. Cl. ......................................... 30/90.6; 30/90.1
[58] Field of Search ........................ 30/90.1, 90.3, 90.4, 30/90.6, 90.7, 90.8

[56] References Cited

U.S. PATENT DOCUMENTS

| | | | |
|---|---|---|---|
| 4,203,333 | 5/1980 | Campari | 30/90.1 |
| 4,345,375 | 8/1982 | Hayward | 30/90.1 |
| 4,379,665 | 4/1983 | Hendershot et al. | 30/90.1 |
| 4,459,881 | 7/1984 | Hughes et al. | 30/90.1 |
| 4,543,717 | 10/1985 | Luka | 30/90.6 |
| 4,738,027 | 4/1988 | Bermier, Jr. et al. | 30/90.6 |
| 4,985,996 | 1/1991 | Steiner | 30/90.6 |
| 5,077,895 | 1/1992 | Okubo et al. | 30/90.6 |
| 5,085,114 | 2/1992 | DeRoss et al. | 30/90.6 |

*Primary Examiner*—Richard K. Seidel
*Assistant Examiner*—Paul M. Heyrana
*Attorney, Agent, or Firm*—Ronald L. Taylor

[57] ABSTRACT

A method and apparatus are disclosed for accurately removing preselected lengths and thicknesses of insulation from an electrical cable. This is accomplished by making a circumferential cut of preselected depth and distance from the end of the electrical cable, through the use of a guide tool in combination with a first cutting tool. Following the circumferential cut in the insulation, the end portion of the electrical cable is secured in a substantially stationary position through the use of one or more clamping devices in combination with a fixturing body. The insulation layer is then removed through the use of a cylindrical cutting tool guided by a guide body into the end of the electrical cable. This second cutting tool is forced axially along the length of the electrical cable and rotated with respect to the cable so as to perform a circular cutting of the cable insulation in an axial direction from the end of the electrical cable to the location of the previous circumferential cut.

14 Claims, 1 Drawing Sheet

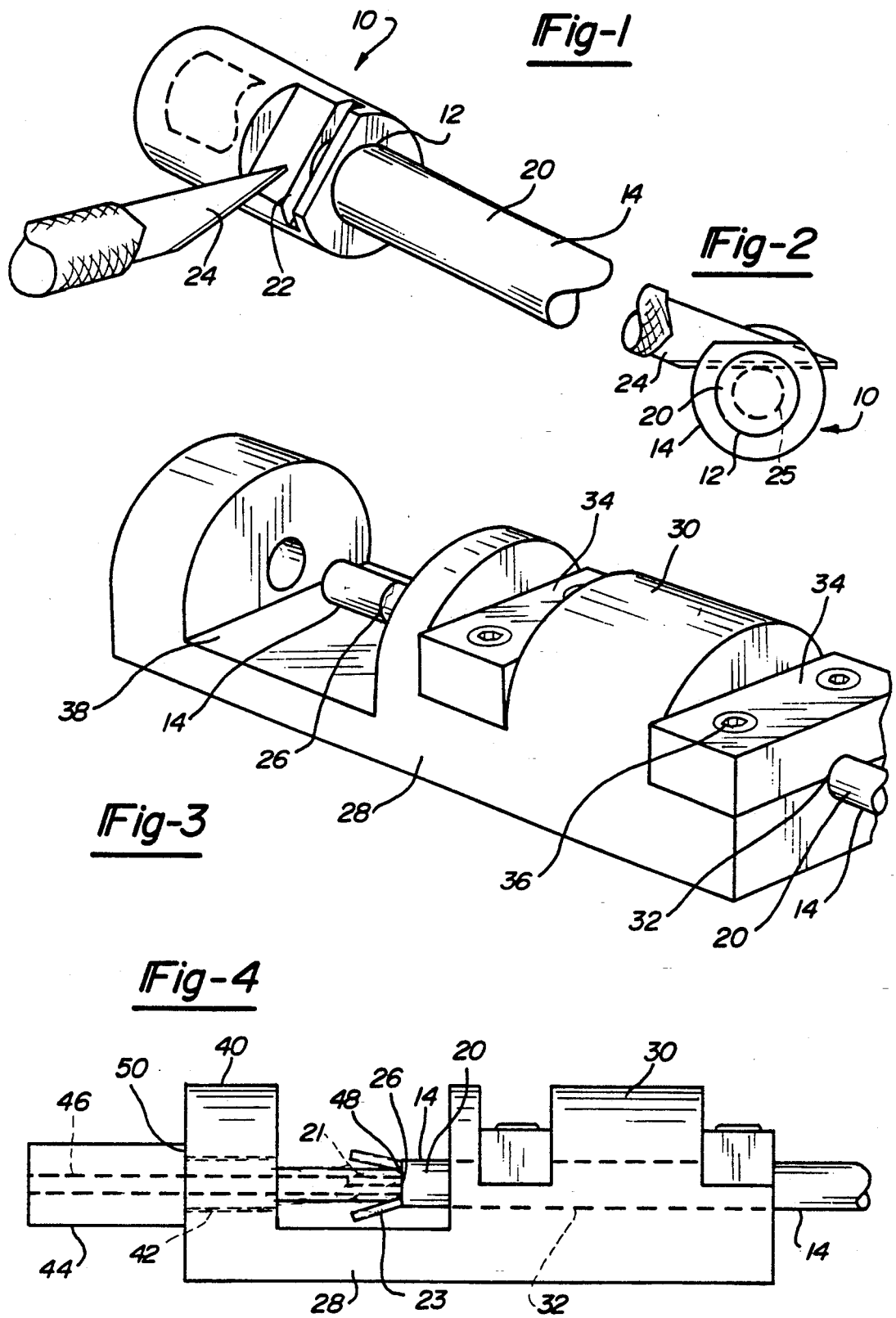

DEVICE FOR TRIMMING COAXIAL CABLE

BACKGROUND OF THE INVENTION

1. Technical Field

The present invention relates generally to cutting devices and particularly concerns a device for accurately removing preselected lengths and thicknesses of insulation from electrical wires and the like.

2. Discussion

Many industrial electrical wiring applications utilize long lengths of electrical conducting wire or cable. These wires or cables typically have a center conductor wire, often composed of some conductive metal or alloy such as copper or aluminum. The center conductor wire is typically enshrouded by a thin layer of nylon or similar protective coating, which aids in electrical insulation of the center conductor wire, as well as protection from the elements exterior to the cable. The center conductor and nylon coating are typically enshrouded by at least one layer of insulation. This insulation is often a flexible material, such as silicone rubber, so as to facilitate bending of the wire as well as adaptation of the wire ends to suit the particular need. The adaptation of the wire ends to suit a particular need often requires that certain lengths and thicknesses of the insulation surrounding the center conductor wire be removed for subsequent connection of the center conductor wire or the attachment of an external connector to the center conductor wire.

It is often necessary for safety reasons that insulation be removed to a specific length along a particular end of the cable. By ensuring that only the required length of the center conductor wire is exposed for connection or attachment purposes, the potential for unwanted contact between the center conductor wire and the external environment is avoided. Contact between the center conductor wire and the external environment is undesirable because of the possibility of transfer of electrical energy from the center conductor wire to an external object or human being, and also because of the possibility of the introduction of moisture or foreign material to the center conductor, which can cause premature degradation, corrosion or interference with an electrical connection.

Different applications may require different thicknesses of insulation to be removed from the ends of an electrical cable, such as for alternate connector selections. In addition, some applications of electrical cable may require a stepwise removal of progressively smaller thicknesses of insulation from ends of certain cables. It is important in these applications that the proper thicknesses and lengths be removed for proper fitting and attachment of connectors and other accessories near or at the cable ends, to prevent degradation or destruction of the insulation by stretching or overtightening to compensate for a poor fitting or attachment connection.

Therefore, the proper removal of insulation from electrical wire requires not only a proper length to be removed according to the particular need, but also requires that the one or more layers of insulation present be cut to the proper depth. The depth for cutting insulation from an electrical wire is especially critical because while it is essential to achieve a cut deep enough to pierce through the insulation material entirely, or through a particular insulation layer entirely, it is necessary that the center conductor wire or the thin nylon or other layer surrounding it not be nicked or damaged in any way. Damage to the center conductor wire or the thin nylon or other layer surrounding it causes a danger of improper electrical connections and/or electrical arcing, as well as resistance heating within the wire. These conditions can pose a fire hazard and as such, should be avoided.

Similarly, many types of electrical wire have more than one layer of insulation which must be cut successively at different locations along the length of the wire for certain applications. It is necessary in these situations to cut each successive layer of insulation to a specific desired depth, for removing an outer layer of insulation, while leaving the next inward layer of insulation intact, without any damage to its external surface.

Previous methods for removing insulation from electrical wire have involved the use of hand cutting tools such as Exacto knives. The use of these cutting tools has presented several disadvantages. Cutting insulation by hand has resulted in inaccuracies and inconsistencies in the dimensions of the cuttings made, including improper depth of cutting, which causes either an incomplete cut or a damaging of the center conductor or the nylon or other layer surrounding it. Additional inaccuracies and inconsistencies involve failures in the location of the cut along the length of the wire, as well as the failure to achieve a substantially accurate circumferential cut of insulation around the cable. Overall, the cutting of electrical wire insulation by hand tends to be time consuming as well as laden with errors which must be corrected by repeating the cutting sequence on a new section of wire and involves a waste of materials.

The need therefore exists for an improved method and apparatus for trimming one or more layers of insulation in varying thicknesses and lengths from coaxial and other types of electrical wires and cables.

SUMMARY OF THE INVENTION

In accordance with the teaching of a preferred embodiment of the present invention, a method and device for trimming coaxial cable are provided. The device of the present invention utilizes a guide tool in combination with a first cutting means, such as an Exacto knife, for making a circumferential cut at a desired location along the length of the cable and at a desired depth within the insulation layer or layers. The guide tool is designed to direct a precise cutting of the insulation material surrounding the center conductor wire in an electrical cable with regard to the depth of cutting, as well as the cutting position along the length of the electrical cable and the accuracy of the cut circumferentially about the cable.

A main body of the device utilizes a fixturing means for securing a portion of previously circumferentially cut cable in a substantially stationary position, while the insulation is cut axially in a circular pattern from the cable end to the previously made circumferential cut by a second cylindrically shaped cutting tool. This second cutting tool is guided into proper position by a second guide located upon the main body. This device therefore provides a convenient means for accurately trimming the insulation from a preselected length and depth of the end portion of an electrical cable. This procedure can be repeated for removal of successively smaller thicknesses of insulation away from the end of a cable.

BRIEF DESCRIPTION OF THE DRAWINGS

The various advantages of the present invention will become apparent to one skilled in the art after reading the following specification and by reference to the drawings in which:

FIG. 1 is a perspective view illustrating a guide means positioned upon the end of an electrical cable;

FIG. 2 is a cross-sectional view illustrating an electrical cable inserted into the guide tool and circumferentially cut by the first cutting means;

FIG. 3 is a perspective view illustrating a main body with attached fixturing body securing an end portion of an electrical wire for removal of a previously cut portion of insulation; and FIG. 4 is a side view illustrating the use of a second cylindrical cutting tool for removing a previously cut end portion of insulation from an electrical wire.

DETAILED DESCRIPTION OF THE PREFERRED EMBODIMENT

It should be understood at the outset that while this invention is described in connection with a particular example, the scope of the invention need not be so limited since those skilled in the art will appreciate that its teachings can be used in a much wider variety of applications than the examples specifically mentioned herein.

The device of the preferred embodiment of the present invention will now be described with reference to FIGS. 1 through 4. More particularly, FIG. 1 is a perspective view illustrating a guide means generally at 10. In a preferred embodiment, guide means 10 is a cylindrically shaped anodized aluminum guide tool having a cylindrical bore 12 of preselected distance from one end for accepting an electrical cable 14 therewithin. The cylindrical bore 12 is sized to a diameter for tightly accommodating the inserted cable 14 and is further sized to a preselected depth for the required amount of insulation 20 to be removed from the cable 14. In one embodiment, the diameter of the electrical cable 14 and the diameter of the cylindrical bore 12 are approximately 265 thousandths of an inch in diameter. Electrical cable 14 contains a center conductor wire (not shown), enshrouded by a thin nylon or similar coating (not shown), which is further enshrouded by one or more layers of insulation 20. The insulation 20 is often a flexible material, such as silicon rubber, which can be easily cut through the use of a sharp blade.

Guide tool 10 is shown to include a slot 22 disposed across one face of the guide tool 10 and located a short distance from the end having the cylindrical bore 12 opening. In a preferred embodiment, the slot 22 is located approximately 15 thousandths of an inch from the end of the guide tool 10 having the cylindrical bore 12 opening. The slot 22 is cut to a preselected depth at least a far as to reach the cylindrical bore 12, and of further depth for cutting into insulation 20 of the electrical cable 14 at the depth desired.

The width of slot 22 is sized to accommodate a first cutting means 24 which in one embodiment can be any type of conventional knife blade or, in a preferred embodiment, an Exacto knife. In operation, electrical cable 14 is inserted into the cylindrical bore 12 of guide tool 10 to a distance equal to the depth of the cylindrical bore 12. Knife blade 24 is inserted into slot 22 to the complete depth of the slot, thus making an indentation or cut into the insulation 20 of electrical cable 14 Knife blade 24 is then rotated circumferentially about electrical cable 14 or the cable 14 is rotated inside the guide tool 10, while maintaining knife blade 24 fully inserted into slot 22 to its complete depth. Through a single 360° circumferential rotation of knife blade 24 about electrical cable 14 or a single 360° rotation of cable 14 inside guide tool 10, a circumferential cut is made in insulation 20 to the exact depth required for the removal of insulation for the particular application. In a preferred embodiment, the guide tool 10 is rotated concurrently with knife blade 24 in making the circumferential cut about the electrical cable 14.

FIG. 2 illustrates a cross-sectional view of an electrical cable 14 inserted into the cylindrical bore 12 of guide tool 10, having insulation 20 cut circumferentially by knife blade 24 to a preselected depth, indicated by the dotted circle at 25.

It should be noted that the dimensions of the cylindrical bore and slot can be altered to achieve circumferential cuts of different desired depths within insulation 20 as well as circumferential cuts at different locations axially along the length of electrical cable 14. Further, it should be appreciated that successive cuts of decreasing depth can be made using more than one guide tool 10 of different bore and slot dimensions upon a single electrical cable 14.

Once a circumferential cut has been made through insulation 20 of electrical cable 14, it is necessary to further cut the insulation 20 in a circular pattern surrounding the center conductor in an axial direction from the end of the cable to the location of the circumferential cut previously made. FIG. 3 is a perspective view illustrating a main body 28 having a fixturing body 30 attached thereto. With reference to FIG. 3, fixturing body 30 contains an annulus 32 disposed throughout the length of the fixturing body 30. Annulus 32 is sized to accommodate the insertion of an electrical cable 14, and is thus of diameter of approximately 265 thousandths of an inch in a preferred embodiment. Fixturing body 30 also includes at least one clamping device 34 for securing an inserted electrical cable 14 in a substantially stationary position within the fixturing body 30. In a preferred embodiment, two clamping devices 34 are employed, each clamping device having a rectangular block shape and secured to the fixturing body through the use of two set screws 36 inserted through each clamping device 34. It should be appreciated that in alternative embodiments, any satisfactory means for securing the clamping devices 34 may be employed without departing from the spirit of the invention.

The main body 28 also includes an exposed region 38 into which the end portion of an electrical cable 14 containing the previously made circumferential cut is positioned. Thus, in operation, set screws 36 are loosened to release the clamping devices 34. An electrical cable 14, with a circumferential cut previously made in insulation 20, is inserted into annulus 32 of the fixturing body 30 so as to expose the end of electrical cable 14 and the circumferential cut location 26 along the length of insulation 20 within the exposed region 38 of main body 28. Set screw 36 are then tightened so as to tighten clamping devices 34 against the fixturing body 30 and the electrical cable 14 inserted therewithin. Through this procedure, the end portion of electrical cable 14 is secured for the removal of insulation 20 in an axial manner from the end of electrical cable 14 to the location of the circumferential cut along the length of the cable.

With reference now to FIG. 4, fixturing body 30 is also shown to include a second guide means, which in a preferred embodiment is a guide body 40 attached to the main body 28. Guide body 40 is positioned upon the main body 28 in a preferred embodiment so as to be in substantial alignment with the fixturing body 30 along main body 28. Guide body 40 includes a cylindrical bore 42 throughout its length, such bore arranged in substantial axial alignment with annulus 32 of the fixturing body 30 and electrical cable 14 inserted therewithin. A cylindrical cutting tool 44 is provided for making a circular cut through insulation 20 in an axial direction along electrical cable 14 from the end of cable 14 to the location of the previous circumferential cut 26. The cylindrical cutting tool 44 has an annulus 46 disposed therewithin, of diameter equal to the desired outer diameter of insulation 20 to remain on electrical cable 14 after cutting. Cylindrical cutting tool 44 further includes a circular cutting edge 48 which performs the circular axial cutting as it is forced and twisted through the insulation material 20. The cylindrical cutting tool 44 is of outside diameter which substantially matches the diameter of cylindrical bore 42, which extends through guide body 40, so as to be guided directly into the end of electrical cable 14 with the center axis of cylindrical cutting tool 44 substantially equivalent to the center axis of electrical cable 14, which is represented by the center conductor wire (not shown) therewithin. In one embodiment, the cylindrical cutting tool 44 further includes a flange 50 for limiting the distance through which the cylindrical cutting tool 44 can be inserted into the guide body 40. Also, in one embodiment, all components of the device except for cutting tool 44 and first cutting means 24 are made from machined aluminum, and anodized after machining.

Thus, in action, once a previously circumferentially cut portion of an electrical cable 14 has been fixedly secured within the fixturing body 30, the center conductor (not shown) of electrical cable 14 is in substantial alignment with the cylindrical bore 42 disposed within guide body 40. Cylindrical cutting tool 44 is then inserted into cylindrical bore 42 from the end of guide body 40 external to the exposed region 38 of main body 28, where the end of electrical cable 14 is exposed. Cylindrical cutting tool 44 is brought into contact at circular cutting edge 48 with the end of electrical cable 14 and is rotated in circular fashion with respect to electrical cable 14 as cutting tool 44 is also forced in an axial direction through insulation 20 to the location of the previous circumferential cut 26 in insulation 20. As the cutting action progresses, the desired remaining portion 21 of insulation 20 as well as the center conductor region of the cable 14 passes through annulus 46 in cylindrical cutting tool 44, and can exit through the opposite end of cylindrical cutting tool 44 if needed. At the same time, the outer portion 23 of insulation 20 being removed is flared away from the remainder of cable 14, as it passes along the outer surface of cylindrical cutting tool 44. When the cutting activity of cutting tool 44 along cable 14 in an axial direction reaches the previous circumferential cut 26 made in insulation 20, the removal of an annular piece of insulation 20 is completed. Depending upon the sharpness of cutting edge 48, the properties of insulation 20, and the strength of rotation and axial force exerted upon cutting tool 44, the cutting action may require less than one full 360 rotation of cutting tool 44 or may require several turns. The addition of a small amount of alcohol can also be used to aid the cutting motion.

It should be appreciated that multiple cylindrical cutting tools 44 of progressively larger inner diameters can be employed to remove successively smaller annular sections of insulation 20 along the length of electrical cable 14. Thus, several cylindrical cutting tools 44 can be manufactured to suit a particular insulation removal requirement. It is therefore possible to perform a stepwise removal of lengths and thicknesses of insulation by making multiple circumferential cuts in insulation 20 by means of a single guide tool 10 having a plurality of slots 22 cut to preselected varying depths, or alternately, through the use of multiple guide tools 10 constructed with slots 22 of differing depths. The successive removal of several pieces of insulation 20 can then be accomplished by the use of multiple cylindrical cutting tools 44, which are rotated circumferentially and forced axially upon the insulation 20 of electrical cable 14 at successive locations along its length. In this procedure also, a small amount of alcohol can be used to aid the cutting motion.

The present invention provides a method and apparatus for accurately removing one or more layers, or portions thereof, of insulation from a preselected length and depth of an electrical wire or cable. The present invention further overcomes disadvantages associated with inconsistencies and inaccuracies of previous hand methods of removing insulation from electrical wires or cables. The present invention also provides a method and apparatus for removing insulation from an electrical wire or cable quickly and conveniently, as it substantially reduces the time required for the removal of insulation from a large number of electrical cable ends. The present invention further accomplishes the removal of insulation from electrical wire or cable at low cost, as the anodized aluminum components of the device of the present invention are relatively easy and inexpensive to produce.

While the above detailed description describes a preferred embodiment of the present invention, it will be understood that the description is exemplary in nature and is not intended to limit the scope of the invention. The present invention will therefore be understood as susceptible to modification, alteration and variation by those skilled in the art without deviating from the scope and the meaning of the following claims.

What is claimed is:

1. A device for removing successive stepwise cylindrical portion of insulation from a cable, such cable including a center conductor disposed upon a longitudinal axis and at least one insulation layer coaxially surrounding said center conductor, such device comprising:

a first cutter including a cutting blade for creating a circumferential cut in at least one insulation layer in a plane substantially orthogonal to said longitudinal axis;

first guide means for guiding the cutting blade;

at least a second cutter including a cylindrical cutting means for creating a cylindrical cut in at least one insulation layer coaxially surrounding the center conductor in an axial direction to said circumferential cut, each cylindrical cutting means having a cylindrical bore disposed therewithin for passage of a portion of said cable therethrough; and a main body having a fixturing means for securing the cable in a substantially stationary position and a second guide means for guiding each cylindrical cutting means.

2. The device of claim 1 wherein the cutting blade comprises a knife blade.

3. The device of claim 1 wherein the first guide means comprises at least one guide tool, each guide tool having a first end, each guide tool having a cylindrical bore of preselected distance from the first end disposed therewithin for accepting the cable, each guide tool having at least one slot of preselected depth disposed in said plane substantially orthogonal to said longitudinal axis for accepting the cutting blade, each guide tool being rotatable circumferentially about the cable when the cable is inserter into each bore.

4. The device of claim 1 wherein the first guide means comprises at least one guide tool, each guide tool having a first end, each guide tool having a cylindrical bore of preselected distance from the first end disposed therewithin for accepting the cable, each guide tool having at least one slot of preselected depth disposed in said plane substantially orthogonal to said longitudinal axis for accepting the cutting blade, said cable being rotatable circumferentially within each guide tool when the cable is inserted into each bore.

5. The device of claim 1 wherein each cylindrical cutting means comprises a cylindrical cutting tool having a cutting end, each cutting tool having a cutting edge at the cutting end.

6. The device of claim 1 wherein the fixturing means comprises:
 a fixturing body attached to the main body, said fixturing body having a length, said fixturing body having a recess throughout its length for accepting the cable; and
 at least one clamp removably attached to the fixturing body.

7. The device of claim 1 wherein the second guide means comprises a guide body attached to the main body, said guide body having a length, said guide body having a bore throughout its length for accepting each cylindrical cutting means.

8. A device for removing successive stepwise cylindrical portions of insulation from a cable, said cable including a center conductor disposed upon a longitudinal axis and at least one insulation layer coaxially surrounding said center conductor, said device comprising:
 a first cutter including cutting blade for creating a circumferential cut in at least one insulation layer in a plane substantially orthogonal to said longitudinal axis, said cutting blade comprising a knife blade,
 a first guide means for guiding the cutting blade, said first guide means comprising at least one guide tool, each guide tool having a first end, each guide tool having a cylindrical bore of preselected distance from the first end disposed therewithin for accepting the cable, each guide tool having at least one slot of preselected depth for accepting the cutting blade, each guide tool being rotatable circumferentially about the cable when inserted into each bore;
 at least a second cutter including cylindrical cutting means for creating a cylindrical cut in at least one insulation layer coaxially surrounding the center conductor in an axial direction to said circumferential cut, each cylindrical cutting means having a cylindrical bore disposed therewithin for passage of a portion of said cable therethrough, each cylindrical cutting means comprising a cylindrical cutting tool having a cutting end, each cutting tool having a cutting edge at the cutting end; and
 a main body comprising a fixturing means for securing the cable in a substantially stationary position and a second guide means for guiding each cylindrical cutting means, said fixturing means comprising a fixturing body attached to the main body and at least one clamp removably attached to the fixturing body, said fixturing body having a length, said fixturing body having a recess throughout its length for accepting the cable, said second means comprising a guide body attached to the main body, said guide body having a length, said guide body having a bore throughout its length for accepting each cylindrical cutting means.

9. A device for removing successive stepwise cylindrical portions of insulation from a cable, said cable including a center conductor disposed upon a longitudinal axis and at least one insulation layer coaxially surrounding said center conductor, said device comprising:
 a first cutter including a cutting blade for creating a circumferential cut in at least one insulation layer in a plane substantially orthogonal to said longitudinal axis, said cutting blade comprising a knife blade;
 a first guide means for guiding the cutting blade, said first guide means comprising at least one guide tool, each guide tool having a first end, each guide tool having a cylindrical bore of preselected distance from the first end disposed therewithin for accepting the cable, each guide tool having at least one slot of preselected depth for accepting the cutting blade, said cable being rotatable circumferentially within each guide tool when the cable is inserted into each bore;
 at least a second cutter including a cylindrical cutting means for creating a cylindrical cut in at least one insulation layer coaxially surrounding the center conductor in an axial direction to said circumferential cut, each cylindrical cutting means having a cylindrical bore disposed therewithin for passage of a portion of said cable therethrough, each cylindrical cutting means comprising a cylindrical cutting tool having a cutting end, each cutting tool having a cutting edge at the cutting end; and
 a main body comprising a fixturing means for securing the cable in a substantially stationary position and a second guide means for guiding each cylindrical cutting means, said fixturing means comprising a fixturing body attached to the main body and at least one clamp removably attached to the fixturing body, said fixturing body having a length, said fixturing body having a recess throughout its length for accepting the cable, said second guide means comprising a guide body attached to the main body, said guide body having a length, said guide body having a bore throughout its length for accepting each cylindrical cutting means.

10. A method for trimming insulation from a cable, said cable including at least a center conductor and at least, one insulation layer, such method comprising the steps of:
 positioning a first guide means upon the cable;
 inserting a first cutter including a cutting blade into the first guide means;

rotating the cutting blade circumferentially about the cable, thereby creating a circumferential cut in the cable insulation;

securing the cable in a substantially stationary position, thereby exposing the connecting end of said cable for cutting; and forcing at least a second cutter including a cylindrical cutting means in an axial direction through the insulation to the circumferential cut, thereby cutting at least one cylindrical portion of at least one insulation layer from the cable.

11. The method of claim 10 wherein the step of positioning a first guide means upon the cable comprises:

providing a guide tool, said guide tool having a first end, said guide tool having a cylindrical bore of preselected distance from the first end disposed therewithin for accepting the cable, said guide tool having at least one slot of preselected depth for accepting said cutting blade, said guide tool being rotatable circumferentially about the cable when the cable is inserted into the bore; and inserting the cable into the cylindrical bore of the guide tool throughout the preselected distance from the first end of the guide tool.

12. The method of claim 10 wherein the step of securing the cable in a substantially stationary position comprises the steps of:

providing a fixturing body having a recess extending therethrough;

inserting the cable through the recess of the fixturing body so as to expose the cable for cutting;

providing at least one clamp removably attached to the fixturing body; and securing each clamp to the fixturing body, thereby securing each clamp against the cable.

13. The method of claim 10 wherein the step of forcing at least one cylindrical cutting means in an axial direction through the insulation to the circumferential cut comprises the steps of:

providing a second guide means, said guide means comprising a guide body, such guide body having a length, said guide body having a bore throughout its length for accepting each cylindrical cutting means;

inserting each cylindrical cutting means through the bore in the guide body so as to contact the cable; and simultaneously rotating each cylindrical cutting means circumferentially about the cable while moving each cylindrical cutting means axially through the cable insulation to the circumferential cut.

14. The method of claim 10 wherein the step of forcing at least one cylindrical cutting means in axial direction through the insulation to the circumferential cut comprises the steps of:

providing a second guide means, said guide means comprising a guide body, such guide body having a length, said guide body having a bore through its length for accepting each cylindrical cutting means;

inserting each cylindrical cutting means through the bore in the guide body so as to contact the cable;

introducing alcohol to the cutting tool; and simultaneously rotating each cylindrical cutting means circumferentially about the cable while moving each cylindrical cutting means axially through the cable insulation to the circumferential cut.

* * * * *